United States Patent
McGee et al.

(10) Patent No.: US 11,789,458 B2
(45) Date of Patent: Oct. 17, 2023

(54) AUTOMATIC MODE RESUME SYSTEM FOR A MOBILE MACHINE

(71) Applicant: Caterpillar Paving Products Inc., Brooklyn Park, MN (US)

(72) Inventors: Robert J. McGee, Peoria, IL (US); Sangameshwar Sonth, Dunlap, IL (US); Timothy M. O'Donnell, Long Lake, MN (US); David E. Gerding, Maple Grove, MN (US)

(73) Assignee: Catepillar Paving Products, Inc., Booklyn Park, MN (US)

( * ) Notice: Subject to any disclaimer, the term of this patent is extended or adjusted under 35 U.S.C. 154(b) by 303 days.

(21) Appl. No.: 16/812,008

(22) Filed: Mar. 6, 2020

(65) Prior Publication Data
US 2021/0278860 A1    Sep. 9, 2021

(51) Int. Cl.
*B60K 35/00*    (2006.01)
*G05D 1/02*     (2020.01)

(52) U.S. Cl.
CPC .......... *G05D 1/0274* (2013.01); *B60K 35/00* (2013.01); *B60K 2370/152* (2019.05); *G05D 2201/02* (2013.01)

(58) Field of Classification Search
None
See application file for complete search history.

(56) References Cited

U.S. PATENT DOCUMENTS

| | | | |
|---|---|---|---|
| 9,164,513 B2 | 10/2015 | Matsuzaki et al. | |
| 9,205,777 B2 | 12/2015 | Swenson et al. | |
| 10,214,877 B2 | 2/2019 | Yamada et al. | |
| 2019/0389382 A1* | 12/2019 | Nishii | G06F 3/14 |
| 2020/0050208 A1* | 2/2020 | Frick | G01C 21/3848 |
| 2021/0148086 A1* | 5/2021 | Ready-Campbell | G05D 1/0274 |
| 2022/0030758 A1* | 2/2022 | Takase | G05D 1/0088 |

FOREIGN PATENT DOCUMENTS

| | | |
|---|---|---|
| JP | 6253677 B2 | 12/2017 |
| JP | 2019-32682 A | 2/2019 |
| WO | 2015/119264 A1 | 8/2015 |

* cited by examiner

*Primary Examiner* — James M McPherson
(74) *Attorney, Agent, or Firm* — Bookoff McAndrews PLLC

(57) ABSTRACT

An automatic mode resume system for a mobile machine and a method for resuming a job performed on a job site by a mobile machine is disclosed. The method may include: storing an interrupted status of the job being performed by the mobile machine upon interruption of the job for the job site; displaying multiple job sites on a display of the machine, each job site including a stored interrupted location and resume location; receiving a selection of the job site from a user input; displaying the interruption location and resume location for the selected job site on the display; and conditioning a resuming of the job in an auto mode of the machine based on whether the machine is positioned adjacent the interruption location or resume location at the selected job site.

20 Claims, 4 Drawing Sheets

AUTOMATIC MODE RESUME SYSTEM FOR A MOBILE MACHINE

TECHNICAL FIELD

The present disclosure relates generally to mobile machines, such as heavy machinery or equipment, and more particularly, to an automatic mode resume system for a mobile machine.

BACKGROUND

Mobile autonomous machines can accomplish large and complicated tasks automatically with better consistency than manually operated machines. However, for large tasks there are situations that can cause the machines to stop the automatic mode. Objects in the path of the vehicle, system issues, job prioritization shifts, or operator shift changes can all cause the need to stop the automatic mode of the machine in the middle of a task. When the automatic mode is interrupted and the machine is moved away from the auto stopping location, it can be difficult to efficiently and accurately resume or restart the job.

WIPO Publication No. WO2015/119264, published on Aug. 13, 2015 ("the '264 publication"), describes a remote operation device for a parallel travel work system. The system includes an autonomous travel work vehicle, such as a tractor, that may store an interrupted position when the autonomous work is interrupted. The system of the '264 publication also discloses identifying the interrupted position as a resume or restart position, and prohibiting autonomous traveling if the autonomous vehicle is not within a predetermined range of the work resume or restart position. However, the '264 publication fails to address various aspects of the restart or resume function that can benefit operator recognition, machine and job efficiently, and the accuracy of the resume or restart process.

The systems and methods of the present disclosure may address or solve one or more of the problems discussed above and/or other problems in the art. The scope of the current disclosure, however, is defined by the attached claims, and not by the ability to solve any specific problem.

SUMMARY

In one aspect, a method for resuming a job performed on a job site by a mobile machine is disclosed. The method may include: storing an interrupted status of the job being performed by the mobile machine upon interruption of the job for the job site; displaying multiple job sites on a display of the machine, each job site including a stored interrupted location and resume location; receiving a selection of the job site from a user input; displaying the interruption location and resume location for the selected job site on the display; and conditioning a resuming of the job in an auto mode of the machine based on whether the machine is positioned adjacent the interruption location or resume location at the selected job site.

In another aspect, a method for resuming a job performed on a job site by a mobile machine is disclosed. The method may include: performing the job at the job site using the machine; interrupting the performance of the job at an interruption location; storing an interrupted status, interruption location, and a resume location, wherein the resume location is offset from the interruption location; moving the machine from the interruption location; displaying multiple job sites on a display of the machine; receiving a selection of the job site from a user input; displaying the interruption location and the resume location for the selected job site and the actual location of the machine on the display; moving the machine in a manual mode to the interruption location; and initiating an auto mode of the machine when the machine is repositioned adjacent the interruption location at the selected job site.

In yet another aspect, an automatic mode resume system for a mobile machine is disclosed. The system may include: a display of the machine; and a controller configured to: store an interrupted status of a job being performed on a job site by the mobile machine upon interruption of the job for the job site; display multiple job sites on the display, each job site including a stored interrupted location and resume location; receive a selection of the job site from a user input; display an icon for the interruption location and resume location for the selected job site on the display, wherein the icon for the resume location includes a location, orientation, and heading of the machine; and condition a resuming of the job in an auto mode of the machine based on whether the machine is positioned adjacent the interruption location or the resume location at the selected job site.

BRIEF DESCRIPTION OF THE DRAWINGS

The accompanying drawings, which are incorporated in and constitute a part of this specification, illustrate various exemplary embodiments and together with the description, serve to explain the principles of the disclosure.

DETAILED DESCRIPTION

Both the foregoing general description and the following detailed description are exemplary and explanatory only and are not restrictive of the features, as claimed. As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus. Further, relative terms, such as, for example, "about," "substantially," "generally," and "approximately" are used to indicate a possible variation of ±10% in a stated value.

Figure 1:
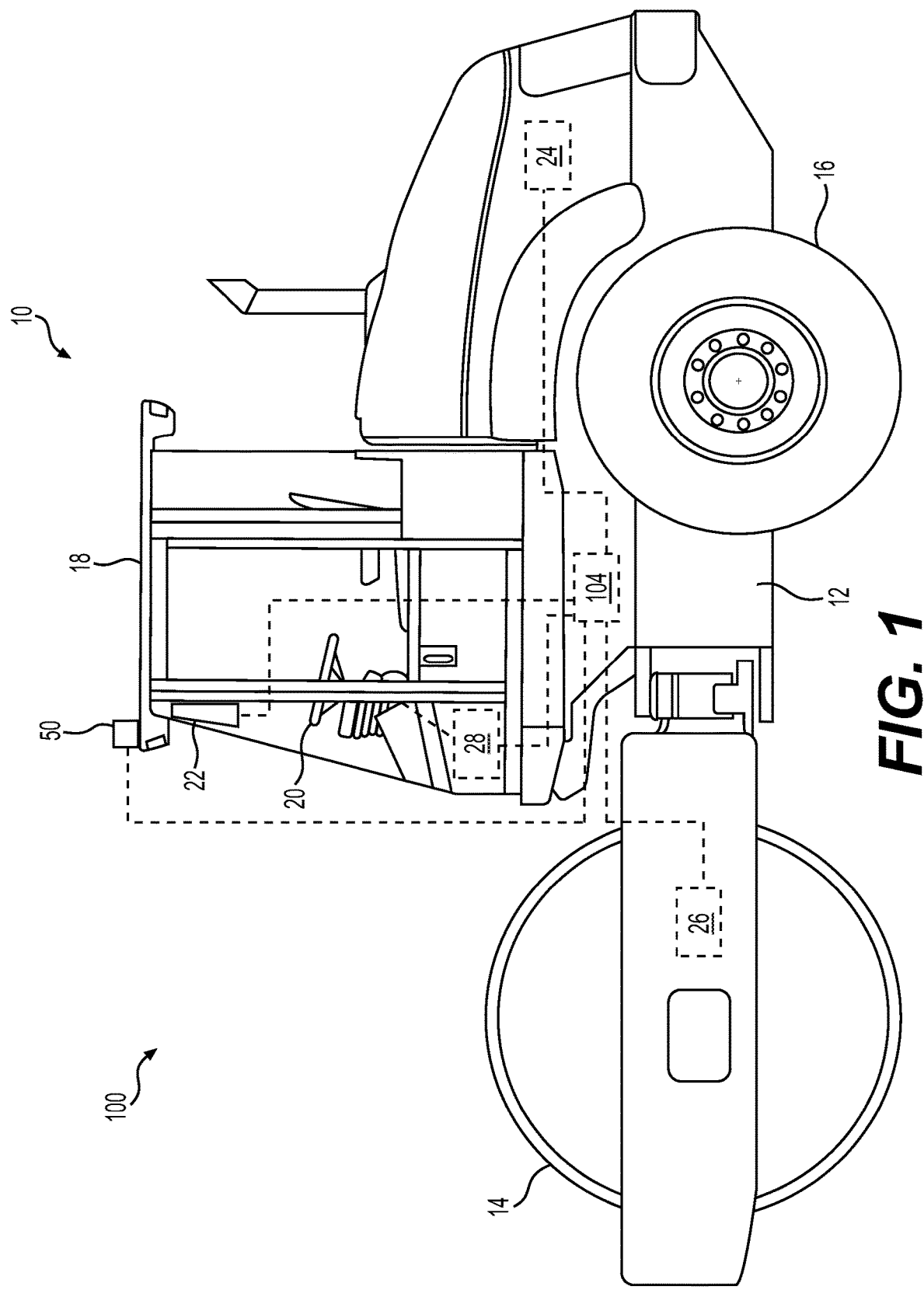
FIG. 1 illustrates a schematic side view of an exemplary mobile autonomous machine including an automatic mode resume system, according to aspects of the disclosure.

FIG. 1 illustrates a schematic side view of an exemplary compactor 10 including an automatic mode resume system 100, according to aspects of the disclosure. As used herein, mobile machine, heavy machinery, or heavy equipment includes any vehicles for executing construction tasks, such as earthwork operations or other construction tasks. In the exemplary embodiment, mobile heavy machinery may include a compactor 10 for use in compacting a work area or job site. However, in general, the current disclosure can be applied as to any mobile heavy machinery or heavy equipment, such as, for example, a paver finisher, rotary mixer, a wheel loader, a motor grader, a backhoe loader, or any another machine or vehicle that may be used at a work area.

Compactor 10 may include a frame 12 attached to ground-engaging mechanisms such as a compacting drum 14 and wheels 16. Frame 12 may support a cab 18, from which a user, or operator, may maneuver and control compactor 10 via user interfaces and displays. The user interfaces may include a steering device 20, such as a steering wheel and/or joysticks, and a display 22, such as a touch-screen display device, keypad with buttons, or the like. Frame 12 may also support components of a propulsion system 24 (shown schematically in FIG. 1) for propelling compactor 10 about a ground surface. Propulsion system 24 may include, for example, engines, motors, batteries, and/or any other equipment necessary to power, move, and/or operate compactor 10.

Drum 14 may include a work implement or other device, such as components of a vibration system 26. Vibration system 26 may include, for example, a central support structure (not shown) fixedly mounted within drum 14 and one or more vibratory exciters (not shown) coupled to the support structure and oscillated by a hydraulic motor or the like. Thus, vibration system 26 may provide a vibration action through drum 14 to compact the ground surface.

Figure 2:
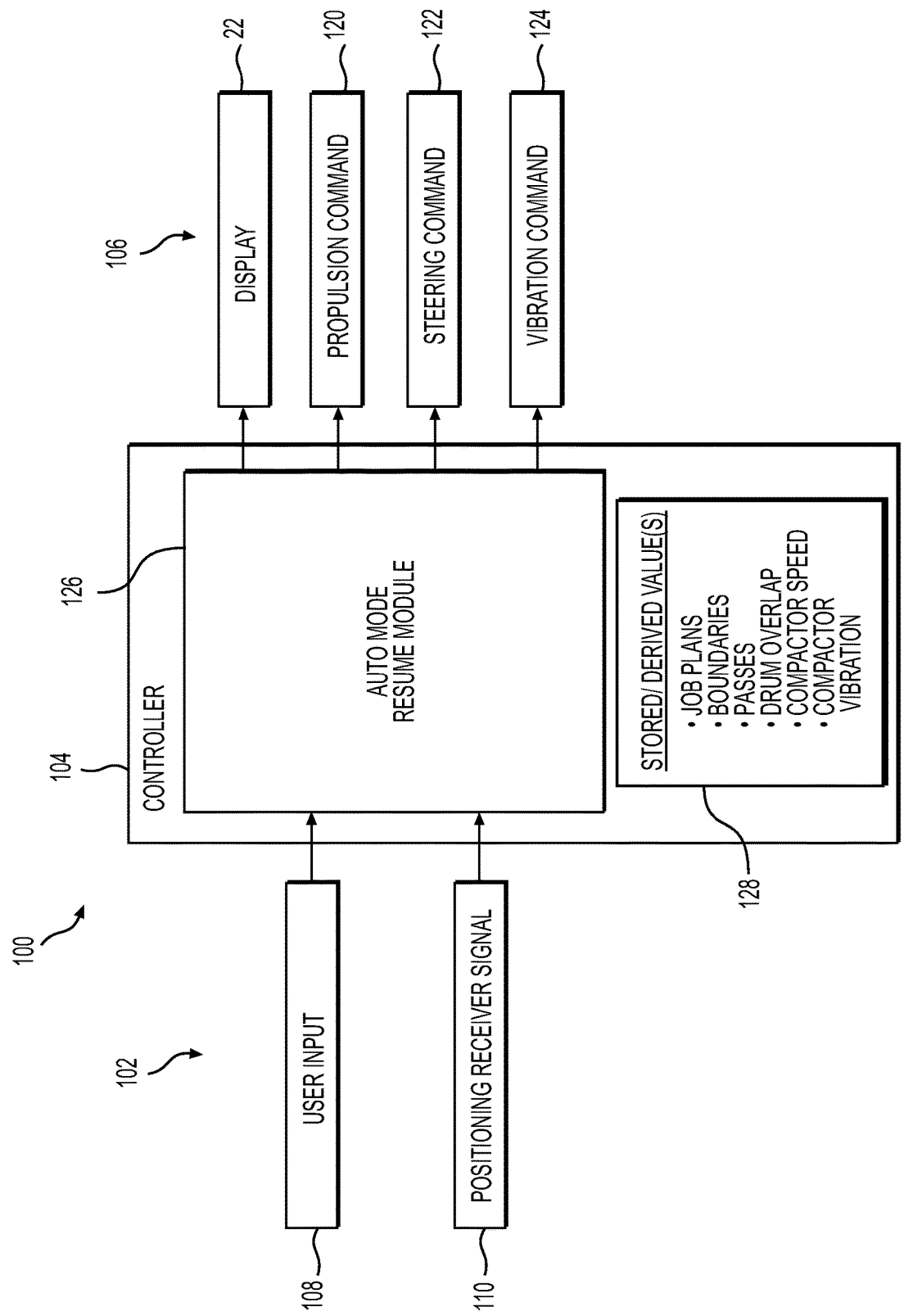
FIG. 2 illustrates a schematic view of the automatic mode resume system of FIG. 1.

Compactor 10 may further include an automatic mode resume system 100, as described in detail in FIG. 2, for automatically and/or semi-automatically controlling aspects of compactor 10. As used herein, the terms automated, autonomous, automatic, semi-autonomous, and/or semi-automatic are used to describe functions that are done without, or with minimal, user intervention. For example, automatic or semi-automatic may include automatic control of at least steering and propulsion (e.g., speed) of compactor 10. Further, semi-automatic may include automatic control of at least steering and propulsion of compactor 10 while requiring user input 108 to verify a user is present in cab 18 to monitor the automatic mode. Alternatively, or additionally, the user may be remote from compactor 10 and the user input 108 may be received from a remote device. The various steps of method 300, described below, may proceed without, or with minimal, user intervention.

As shown in FIG. 1, automatic mode resume system 100 may include a controller 104, such as an electronic control module, one or more positioning receivers 50, and one or more systems 24, 26, 28 of compactor 10. Positioning receivers 50 and systems 24, 26, 28 may be in communication with controller 104 (as shown in FIG. 1 by the dashed lines) through wired communication lines and/or through wireless means.

Positioning receivers 50 may include any type of sensor for sensing, measuring, calculating, or otherwise determining a geographical position (e.g., a geolocation) of compactor 10. For example, positioning receivers 50 may include a global positioning system (GPS) receiver in communication with a global navigation satellite system (GNSS) for receiving a geolocation from the GNSS. Positioning receivers 50 may include a high accuracy system, such as real-time kinematic (RTK) positioning, for precisely calculating geographic locations of the positioning receivers 50 within sub-meter to centimeter accuracy. For example, high accuracy may be within three centimeters or less. It is understood that positioning receivers 50 may be positioned on compactor 10 in any location and may include any type of sensor (e.g., cellular, Wi-Fi, Bluetooth, etc.) for sensing, measuring, calculating, or otherwise determining a geolocation of compactor 10 with high accuracy.

Compactor 10 may also include any other type of sensor, such as inertial measurement units, object detection sensors (e.g., radars), or the like, for sensing or measuring information related to compactor 10 and providing the information to controller 104.

The one or more systems 24, 26, 28 of compactor 10 may include propulsion system 24, vibration system 26 and a steering system 28 (shown schematically in FIG. 1) in communication with controller 104 (as shown in FIG. 1 by dashed lines). Controller 104 may automatically, or semi-automatically, control aspects of systems 24, 26, 28, as detailed below. Propulsion system 24 may include a source of power (e.g., engine, motor, batteries, or the like) and may convert the power to motion of compactor 10 through axles (not shown) and wheels 16 such that compactor 10 may be propelled or otherwise moved about the ground surface. Vibration system 26 may include the hydraulic motor for oscillating or otherwise exciting the vibratory exciters. Steering system 28 may include the steering device 20 and a system of gears (not shown), joints (not shown), and other components to control a direction of the motion of compactor 10. Thus, steering system 28 may convert rotation and/or motion of steering device 20 into a swiveling movement of wheels 16 for steering compactor 10. It is understood that compactor 10 may include any other type of system for controlling aspects of compactor 10.

Automatic mode resume system 100 may further include display 22 for displaying information related to compactor 10 and receiving input from a user, such as an operator of compactor 10. Display 22 may be in communication with controller 104 through wired communication and/or wireless means (as shown in FIG. 1 by dashed lines). As will be described in more detail below, display 22 may communicate with controller 104 to display an "Auto" icon 416 (FIG. 4), or similar interface, such that an operator may activate the "Auto" icon 416 to enter the automatic mode. Display 22 may also communicate with controller 104 to display an actual position 408 of compactor 10, an interrupted location 410 and/or a restart location 412, as detailed further below with reference to FIGS. 3 and 4.

FIG. 2 illustrates a schematic view of the automatic mode resume system 100 for operation and/or control of at least portions of compactor 10. Automatic mode resume system 100 may include inputs 102, controller 104, and outputs 106. Inputs 102 may include a user input 108 and positioning receiver signal 110. Output 106 may include, for example, display 22, propulsion command 120, steering command 122, and vibration command 124.

Controller 104 may embody a single microprocessor or multiple microprocessors that may include means for controlling aspects of compactor 10. For example, controller 104 may include a memory (e.g., a non-volatile memory), a secondary storage device, a processor, such as a central processing unit or any other means for accomplishing a task consistent with the present disclosure. The memory or secondary storage device associated with controller 104 may store data and/or software routines that may assist controller 104 in performing its functions. Further, the memory or secondary storage device associated with controller 104 may also store data received from the various inputs 102 associated with automatic mode resume system 100. Numerous commercially available microprocessors can be configured to perform the functions of controller 104. It should be appreciated that controller 104 could readily embody a general machine controller capable of controlling numerous other heavy machinery functions. Various other known circuits may be associated with controller 104, including signal-conditioning circuitry, communication circuitry, hydraulic or other actuation circuitry, and other appropriate circuitry.

User input 108 may include input received from display 22. User input 108 may also include input received from steering device 20 and/or any other user interface and/or device. Controller 104 may receive user input 108 through manual controls, such as, for example, joysticks, keypads, acceleration and/or brake pedals, emergency stop button or interface, park brake, or any other user interface and/or device. Input received from display 22 may include, for example, signals from a touchscreen and/or buttons on, or otherwise associated with, display 22. User input 108 may include user activation and/or deactivation of the "Auto" icon 416 (FIG. 4), as detailed further below.

Positioning receiver signal 110 may include a signal associated with a geolocation of compactor 10 communicated from positioning receivers 50 to controller 104. For example, positioning receivers 50 may receive, measure, and/or determine the geolocation, as detailed above, and may communicate the geolocation to controller 104. Based on the signal 112, controller 104 may determine the geolocation provided by positioning receivers 50. For example, controller 104 may determine an actual location of compactor 10 based on the geolocation provided by positioning receivers 50. Controller 104 may also derive geolocation of compactor 10 from other sources, including other sensors.

Inputs 102 may also include other inputs, such as, for example, a propulsion signal, steering signal, and vibration signal. The propulsion signal be indicative of a propulsion function of compactor 10 (e.g., power output or amount of propulsion of propulsion system 24 for providing a desired speed of compactor 10). The steering signal may be indicative of a steering function of compactor 10 (e.g., steering provided by steering system 28). The vibration signal may be indicative of a vibration function of compactor 10 (e.g., vibration frequency and/or amplitude of the vibratory exciters or speed of the hydraulic motor of vibration system 26).

Outputs 106 from controller 104 may include display information provided to display 22. Such display information may include, for example, those aspects noted above, including an actual location of compactor 10, an interrupted location, and/or a restart position. The display information may additionally include, for example, a job plan for one or more job sites, completion status of the job, and/or an auto mode initiate icon, as detailed further below.

Propulsion command 120 may control propulsion system 24 to automatically propel or otherwise move compactor 10 about the ground surface. For example, propulsion command 120 may control propulsion system 24 (e.g., the engine, motor, batteries, etc.) to control a power output to provide motion to the wheels 16 to move compactor 10 at a desired speed. Propulsion command 120 may move compactor 10 in a forward direction and/or a reverse direction. Steering command 122 may control steering system 28 to automatically maneuver or otherwise steer compactor 10 about the ground surface. For example, steering command 122 may control the gear, joints, and/or other components of steering system 28 to control the swiveling movement of wheels 16 for steering compactor 10. Vibration command 124 may control vibration system 26 to automatically actuate the vibration motor at a desired or set speed (e.g., rotations per minute) for automatically providing the vibration action of vibratory exciters at a frequency and/or amplitude. The frequency may correspond to a speed of oscillation of the vibratory exciters and the amplitude may correspond to an amount of force applied through drum 14 on the ground surface.

Controller 104 may also include an automatic (auto) mode resume module 126 and one or more stored and/or derived values 128. Auto mode resume module 126 may receive inputs 102, implement a method 300 for controlling compactor 10, and control outputs 106, as described with reference to FIG. 3 below. The stored and derived values 128 may include values stored in the memory of controller 104. The stored and derived values 128 may include, for example, one or more job plans for one or more job sites for compactor 10. For example, the job plans may include one or more settings, such as one or more boundaries, compactor speed, vibration for the job site, drum overlap, and/or one or more paths or passes of compactor 10. Each boundary may include a user defined boundary of a job site for operating the automatic mode in the job site, as detailed below. The compactor speed may include a speed setting for deriving and controlling propulsion command 120 to control a speed of compactor 10. The vibration for the job site may include vibration settings such as frequency and/or amplitude of vibration system 26. The vibration setting may include multiple different frequencies and/or amplitudes for various locations of the job site. The one or more paths may include travel paths within each boundary (e.g., each job site) generated by controller 14 for maneuvering compactor 10 about the job site. The one or more paths may each correspond to a pass of compactor 10 for performing the job at the job site. Drum overlap may include a setting for an amount of overlap of the drum between passes. As used herein, a pass is a directional travel path of compactor 10 and may define an area for compacting (e.g., when vibration is on) or otherwise performing a job function of the mobile autonomous machine.

INDUSTRIAL APPLICABILITY

The disclosed aspects of automatic mode resume system 100 of the present disclosure may be used for any type of mobile machine, heavy machinery, heavy equipment that is used at a job site.

Figure 4:
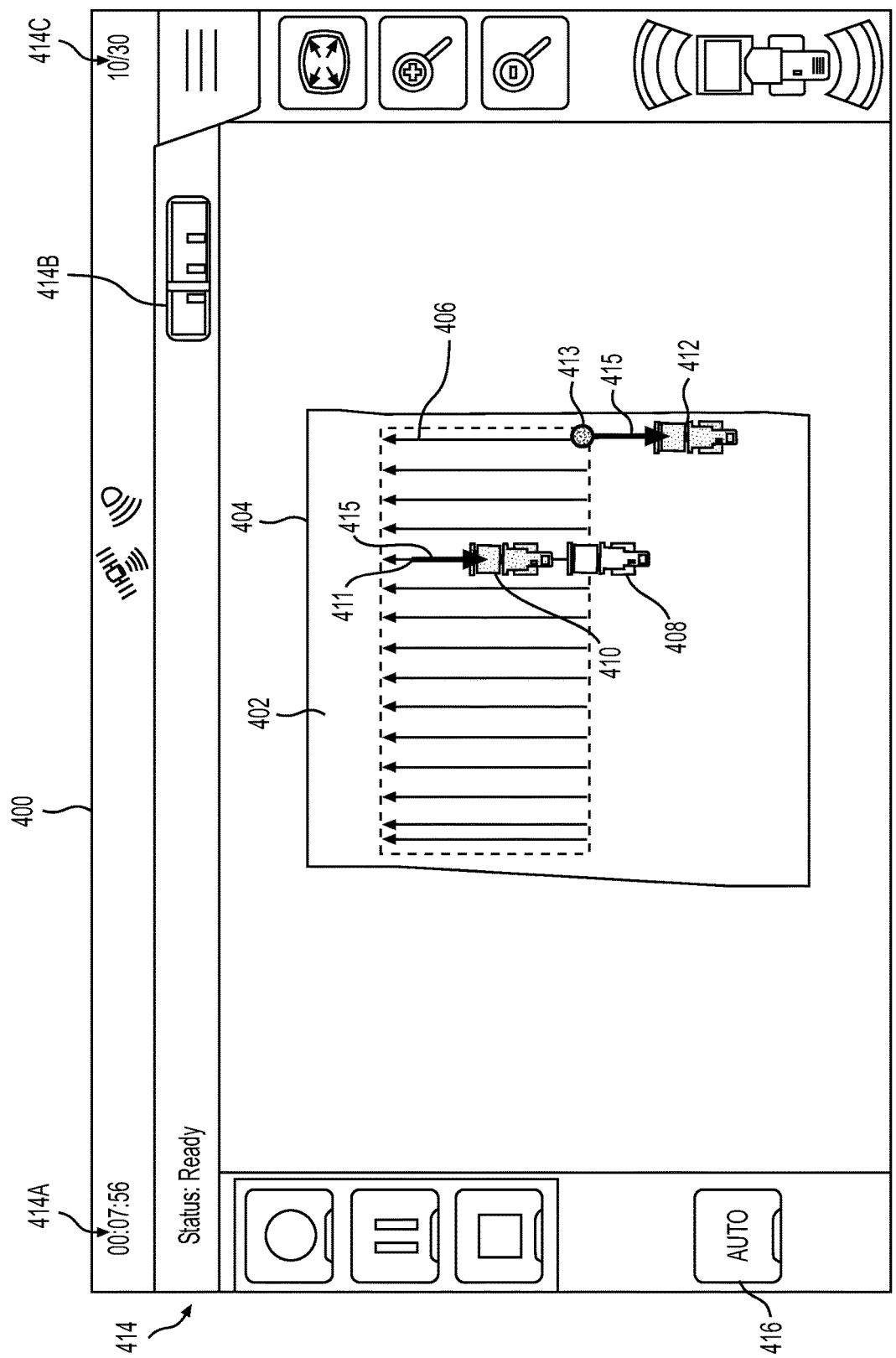
FIG. 4 provides an exemplary interface of a display of the automatic mode resume system of FIGS. 1 and 2.

Referring to FIG. 1, during manual operation of compactor 10, an operator may maneuver compactor 10 about a ground surface by controlling aspects of propulsion system 24 and steering system 28, as described above. Further, the operator may maneuver compactor 10 to initially generate or define a boundary of a desired job site. For example, as operator moves compactor 10 about a perimeter of a desired job site, positioning receivers 50 may record, or store (e.g., in the memory of controller 104), a path travelled by compactor 10 to generate the boundary of the job site. Thus, the boundary may define a perimeter of a desired job site. Controller 104 may then generate a job plan for the job site including one or more paths (e.g., passes) within the boundary, compactor speed, compactor vibration (e.g., frequency and/or amplitude), number of paths or passes, heading of compactor 10 for the paths or passes, and/or drum overlap. The paths may define areas for maneuvering compactor 10 along the one or more paths (e.g., manually and/or automatically) to complete tasks within the job site. The paths may also correspond to areas within the boundary in which the vibration system of compactor 10 is activated (e.g., vibration is on) for providing a desired compacting operation of compactor 10. Controller 104 may display the boundary and paths on display 22 for viewing by the operator (FIG. 4). The operator may define multiple boundaries each corresponding to a different job site for compactor 10 and controller 104 may generate and store job plan settings for each job site including the boundary, compactor speed, compactor vibration, paths (e.g., passes), and drum overlap for each job site.

When the compactor 10 is at a desired job site, the operator may desire to use the automatic mode such that controller 104 automatically, or semi-automatically, controls aspects of compactor 10 to complete the tasks at the job site. For example, controller 104 may automatically control propulsion system 24, vibration system 26, steering system 28, and/or any other system of compactor 10 to maneuver compactor 10 about the job site to complete any tasks (e.g., compacting the job site). However, the automatic mode may become interrupted (e.g., due to operator override, objects in the path of the compactor 10, system issues, etc.) before a job at the job site is complete. If the compactor 10 is then moved away from the interrupted location, it may be difficult to efficiently and accurately restart the task and/or job.

Figure 3:
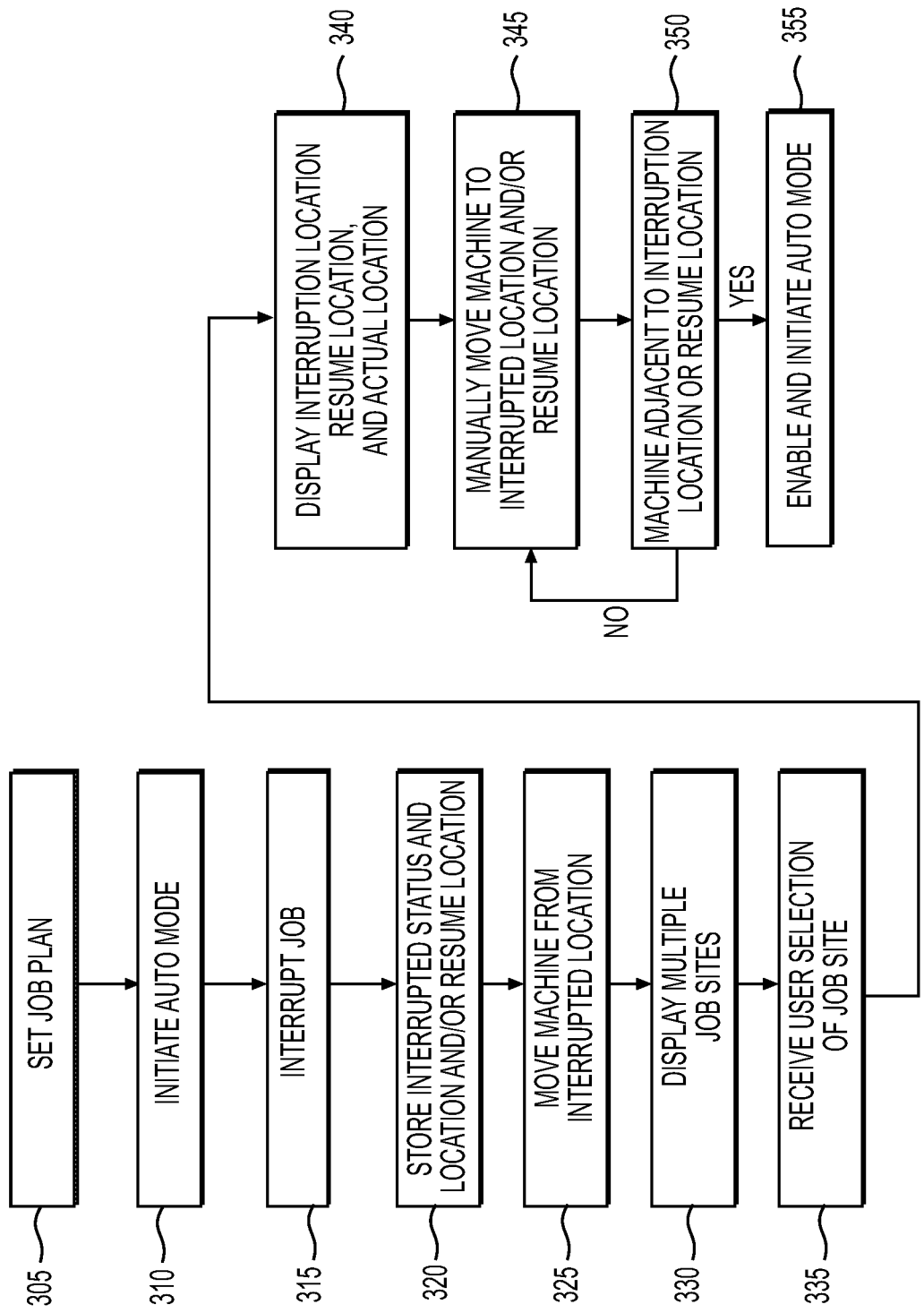
FIG. 3 provides a flowchart depicting a method for resuming a job performed on a job site by the mobile autonomous machine using the automatic mode resume system of FIGS. 1 and 2.

FIG. 3 illustrates a flowchart depicting an exemplary method 300 for resuming a job performed on a job site by a mobile machine (e.g., compactor 10). In an initial step 305, controller 104 may set a job plan, as detailed above. For example, controller 104 may define a boundary of the job site while the operator maneuvers compactor 10 around the perimeter of the job site. Controller 104 may also receive and/or derive and store settings for the job site, such as compactor speed, compactor vibration, paths (e.g., passes), and drum overlap. Controller 104 may store multiple job sites and settings for each job site. When the job plan has been set and certain conditions have been met, the operator may initiate the auto mode (step 310). The conditions may include, for example, compactor 10 aligned at or adjacent a start location. Controller 104 may store the start location as a restart location, as detailed further below.

During the auto mode, controller 104 may automatically control the propulsion, steering, and/or vibration of compactor 10 to perform the job at the job site based on the job plan. In step 315, controller 104 may interrupt the performance of the job at an interruption location. For example, the auto mode may be disabled if certain conditions are met, such as objects in the path of compactor 10, system issues, and/or manual override (e.g., received via user input 108).

When the performance of the job is interrupted, controller 104 may stop movement of compactor 10. The stopping location may correspond to an interrupted location. In step 320, auto mode resume module 126 may store the interrupted status, the interrupted location, and/or a resume location. For example, the interrupted status may include a completion status of the job including a number of passes remaining, an amount of time remaining to complete the job, and the interrupted location and resume location at the job site, as detailed below with reference to FIG. 4. The resume location may correspond to a required location to position compactor 10 to resume the auto mode at or adjacent the interrupted location. The resume location may be different than the interrupted location, as detailed further below. For example, the resume location may be offset from the interrupted location. However, in some embodiments, the resume location may be defined at the interrupted location such that the resume location and the interrupted location are the same. Controller 104 may store an interrupted status, interrupted location, and/or a resume location of multiple job sites. For example, each stored job site may include a stored interrupted location, resume location and/or restart location, as detailed further below.

In step 325, the operator may manually move compactor 10 from the interrupted location and/or from the job site. It is understood that controller 104 may also automatically move compactor 10 from the interrupted location as a different automatic function than the auto mode for completing the job plan.

The operator may then desire to complete a job and/or restart a job at the job site. Accordingly, in step 330, module 126 may display multiple job sites for user selection. In step 335, module 126 may receive user selection of a desired job site via user input 108. For example, the operator may select a job site to resume or restart a job. The operator may then control compactor 10 to reenter the selected job site (e.g., move compactor 10 within the boundary for the job site). Module 126 may display the job plan for the job site and the completion status, including the interrupted location, on display 22. In one aspect, controller 104 may use the positioning receiver signal 110 to recognize when compactor 10 is in (e.g. at start-up of compactor 10), or is moving into/entering a particular job site, and the completion status, interrupted location, resume location and/or restart location for the particular job site may also be automatically displayed on display 22.

Thus, in step 340, module 126 may display the actual location of compactor 10 and the interruption location and/or resume location for the selected job site. Module 126 may also display a restart location at a beginning of a first path or pass for restarting the job, as detailed below. As used herein, restarting the job includes resetting the interrupted settings to a start setting (e.g., zero passes completed, zero percent completion, and maximum amount of time remaining). Thus, the restart location may correspond to the start location for starting/restarting the job. The operator may manually move and align compactor 10 to the interrupted location, resume location, or the restart location. The resume location may be displayed as an icon 410 (FIG. 4) on display 22 that displays a location, orientation, and heading of compactor 10 at the time of interruption. Likewise, the restart location may be displayed as an icon 412 (FIG. 4) on display 22 that displays a location, orientation, and heading of compactor 10 for restarting the job. Thus, the operator may align the compactor 10 in the location and orientation according to the icon 410 or icon 412. The location and orientation may also include thresholds for distance and orientation for correctly aligning compactor 10. For example, the operator may align compactor 10 at a distance offset and/or adjacent from the resume location or interrupted location. For example, the resume location may be positioned offset or adjacent (e.g., behind) the interruption location. The interruption location may be displayed as an icon, such as an arrow, dot, or the like. The operator may also align compactor 10 at an offset angle orientation (e.g., a degree difference) from the interrupted path. The display 22 may also show the heading of compactor 10 at the time of interruption for aligning compactor 10 in a correct direction for performing the job. Thus, the operator may align compactor 10 at, adjacent to, and/or offset from the interrupted location and/or the resume location.

In step 345, the operator may manually move compactor 10 to the interrupted location (e.g., by aligning the actual location with the resume location icon 410), as detailed above. For example, the operator many move compactor 10 to a location adjacent or offset from the interruption location or the resume location. In step 350, module 126 may determine whether compactor 10 is adjacent the interrupted location and/or the resume location. For example, module 126 may determine whether compactor 10 is on the interrupted path and is located at, adjacent to, or offset from the interrupted location or resume location. If compactor 10 is not adjacent the interrupted location (step 350: NO), the operator may continue to manually move compactor 10 to align the compactor 10 with the interrupted location (step 345). In step 355, when compactor 10 is adjacent the interrupted location (step 350: YES), module 126 may enable and initiate auto mode resume or restart. For example, module 126 may enable auto mode (e.g., display the auto icon 416) resume or restart when compactor 10 is located adjacent the interrupted location or resume location within the distance and orientation thresholds and at the correct heading. The heading may also be flipped, or otherwise changed, such that compactor 10 may be moved in an opposite direction (e.g., reverse instead of forward) than when the job was interrupted. In the exemplary embodiment, enabling the auto mode may include controller 104 displaying an "Auto" icon 416 (FIG. 4), or the like on display 22. When the operator activates the "Auto" icon 416, module 126 may resume or restart (e.g., initiate) the auto mode to resume or restart the interrupted job. For example, module 126 may display a prompt on display 22 for confirming resume or restart of the job. Thus, module 126 may resume or restart auto mode when user input 108 is received.

In some embodiments, the auto mode may only be resumed if compactor 10 is aligned at, adjacent to, or offset from the interrupted location or resume location and the auto mode may only be restarted if compactor 10 is aligned at, adjacent to, or offset from the restart location. For example, module 126 may display or enable only a resume icon (not shown) when the compactor 10 is aligned on the interrupted path and at or adjacent the interrupted location or resume location. Likewise, module 126 may display or enable only a restart icon when the compactor 10 is aligned on the first path and at or adjacent the restart location. Thus, module 126 may prevent an operator from restarting a job at the interrupted location and prevent the operator from resuming a job at the restart location.

If the compactor 10 is aligned offset from (e.g., in front of by a threshold distance) the resume location when auto mode is resumed or restarted, module 126 may automatically reverse compactor 10 prior to moving forward to continue the job. For example, the operator may align compactor 10 at or near the interruption location and initiate auto mode and controller 104 may reverse compactor 10 to the resume location prior to resuming the job. Reversing in such a way may enable vibration system 26 to gradually increase to the interrupted frequency and/or amplitude prior to passing through the interrupted location. This may help to ensure even compaction of the ground surface after interruption. The vibration system 26 may similarly be gradually increased when the compactor 10 is aligned behind the interrupted or restart location. It is understood that the operator may also align compactor 10 at the resume location (e.g., behind the interrupted location) and module 126 may proceed to move compactor 10 forward without reversing.

FIG. 4 depicts an exemplary interface 400 of the interrupted location, resume location, and restart location of a job site displayed on display 22. Interface 400 may include a display of a job site 402, a boundary 404 of the job site 402, the one or more paths 406, and an actual location 408 of compactor 10. Module 126 may also display multiple job sites on a single interface for user selection of a job site, as detailed above. The job site 402 may be defined by the boundary 404, as detailed above. The paths 406 may include arrows for indicating a heading direction and may correspond to areas in which vibration is turned on for compaction or otherwise performing a job. While the exemplary embodiment in FIG. 4 includes fifteen paths, it is understood that a job site 402 may include any number of paths or passes generated based on dimensions of the job site 402, size of compactor 10 and/or drum 14, and an amount of drum overlap for the job site 402, and/or any other job site and/or compactor 10 settings. Further, while the boundary 404 is depicted as a generally rectangular shape in FIG. 4, it is understood that boundary 404 may include any shape defined by the operator moving compactor 10 about a perimeter of the job sit, as detailed above, and may include curved and/or non-linear boundary lines. Likewise, while the paths 406 are depicted as being generally straight paths in FIG. 4, paths 406 may include curved and/or non-linear paths. For example, the shape of paths 406 may correspond to the shape of boundary 404.

The actual location 408 may be displayed as an icon or similar visual indicator and may include a general shape of compactor 10 for indicating an actual location, orientation, and/or heading of compactor 10 within the job site (e.g., based on positioning receiver signal 110). The resume location may be displayed as a resume location icon 410 or similar visual indicator and the interrupted location may be displayed as an interrupted location icon 411, as will be discussed in more detail below. Likewise, the restart location may be displayed as a restart location icon 412 or similar visual indicator and may include a restart location offset icon 413. As shown in FIG. 4, the resume location icon 410 may be at a location along a path 406 at or adjacent the interruption location icon 411. The restart location icon 412 may be at or adjacent a beginning of a first path 406 for restarting the job. For example, the restart location offset icon 413 may be at the beginning of the first path 406 and the restart location icon 412 may be offset or adjacent from the restart location offset icon 413.

As detailed above, the icons 410, 412 may provide location, orientation, and heading information in a readily identifiable icon or visual indicator. For example, the icons 410, 412 may include a general shape of compactor 10 and an operator may control compactor 10 to align the actual location 408 icon with the resume location icon 410 or the restart location icon 412. Further, the icons 410, 412 may include a different color and/or shading than the actual location 408 icon for easily differentiating between the icons 410, 412 and the actual location 408. Thus, an operator may easily and accurately align compactor 10 with the interrupted location, resume location, and/or the restart location to resume and/or restart the auto mode, respectively. The icons 410, 412 may also include distance and/or orientation offsets indicated by dots, arrows, or other similar visual indicators, as detailed above. For example, the resume location offset may be located just in front of (e.g., adjacent) the resume location (e.g., resume location icon 410) and may correspond to the interrupted location icon 411. Controller 104 may also display a line, such as an arrow 415, between the interrupted location icon 411 and the resume location icon 410 when the resume location is offset from the interrupted location. For example, the interrupted location 411 may be located at a tail end of the arrow 415 and the resume location icon 410 may be located at an arrowhead (e.g., a tip) of arrow 415. Likewise, the restart location offset may be located just in front of (e.g., adjacent) the restart location (e.g., restart location icon 412) and may correspond to the restart location offset icon 413. Controller 104 may similarly display a line, such as an arrow 415, between the restart location offset icon 413 and the restart location icon 412 when there is an offset.

A length of the arrows 415 may correspond to a distance required to increase a speed of the compactor 10 on resume and/or restart to a compactor speed setting as the compactor 10 passes through the interruption location 411 and/or the restart location offset icon 413. For example, if the compactor speed setting is a relatively slow speed, the arrows 415 may be relatively shorter and if the compactor speed setting is a relatively higher speed, the arrows 415 may be relatively longer. Thus, the length of the arrow 415 may be proportional to the compactor speed setting. If the operator aligns compactor 10 at the interrupted location icon 411 or along the line of the arrow 415, module 126 may reverse compactor 10 to the resume location icon 410 (e.g., to the tip of arrow 415) when auto mode is resumed prior to moving forward. Accordingly, module 126 may control vibration system 26 to gradually increase to an interrupted vibration setting as compactor 10 passes through the interrupted location. Module 126 may similarly reverse to the restart location icon 412 when auto mode is restarted if the operator aligns compactor 10 at restart location offset icon 413 or along the line of arrow 415. It is understood that the arrows 415 may correspond to one or more of compactor speed, vibration setting, or another other machine parameter or setting that requires a desired state by the time compactor 10 reaches the interrupted location 411 or restart location offset 413. Further, the arrow 415 between the icon 411 and icon 410 may be the same or different length than the arrow 415 between the icon 413 and icon 412 based on the one or more settings.

As further shown in FIG. 4, interface 400 may include status indicators 414 for indicating an interruption status and/or completion status of the job. For example, status indicators 414 may include a time remaining indicator 414A, a job completion indicator 414B, and/or a passes completed indicator 414C. Time remaining indicator 414A may indicate a time remaining to complete the job. Job completion indicator 414B may indicate a completion percentage of the job. Passes completed indicator 414C may indicate a number of passes that have been completed and the total number of passes for the job. Interface 400 may also display the "Auto" icon 416 when the certain conditions have been met (e.g., actual location 408 of compactor 10 is aligned and/or adjacent with the resume location icon 410, interrupted location icon 411 or the restart location icon 412).

Automatic mode resume system 100 may allow for resuming auto mode at or near an interrupted location, a resume location and/or restarting a job at a restart location (e.g., at the start location for the job). For example, system 100 may display the icons of the interrupted, resume location, and restart location including location, orientation, heading to help an operator easily align compactor 10 at the interrupted location and/or restart. Further, system 100 may enable storage, display, and selection of multiple job sites each having an interrupted location, resume location, and/or restart location for easily resuming and/or restarting jobs at various job sites. Displaying a resume location offset from the interrupted location may also enable a work implement system (e.g., the vibration system 26) to gradually increase to an interrupted setting as the machine moves through the interrupted location. Thus, system 100 may enable an operator to resume and restart a job more efficiently and accurately.

It will be apparent to those skilled in the art that various modifications and variations can be made to the disclosed system without departing from the scope of the disclosure. Other embodiments of the disclosure will be apparent to those skilled in the art from consideration of the specification and practice of the invention disclosed herein. For example, the icons and indicators 408-416 may include different types of icons or visual indicators and may include different colors and/or shading. It is intended that the specification and examples be considered as exemplary only, with a true scope and spirit of the invention being indicated by the following claims.

What is claimed is:

1. A method for resuming a job performed on a job site by a mobile machine, comprising:
   moving the mobile machine about a perimeter of the job site while recording a path of the mobile machine as the mobile machine moves about the perimeter;
   generating a job plan for the job site based at least in part on the path about the perimeter;
   storing an interrupted status of the job being performed by the mobile machine upon interruption of the job for the job site;
   moving the mobile machine outside of the perimeter of the job site following the interruption;
   displaying multiple job sites on a display of the mobile machine, each job site including a stored interruption location and a resume location;
   receiving a selection of the job site from a user input;
   displaying the interruption location and the resume location for the selected job site on the display; and
   wherein the job is resumed in an auto mode of the mobile machine based, at least in part, on the job plan including the path about the perimeter that was generated by recording the path of the mobile machine and whether the mobile machine is positioned at an offset distance or orientation from the interruption location and the resume location at the selected job site.

2. The method of claim 1, wherein the display includes a plurality of icons corresponding, respectively, to an icon for the interruption location, the resume location, and an actual location of the mobile machine.

3. The method of claim 2, wherein the icon for the resume location and the icon for the actual location each includes a location, an orientation, and a heading of the mobile machine.

4. The method of claim 3, wherein the icon for the resume location and the icon for the actual location each include a shape of the mobile machine.

5. The method of claim 1, wherein the job is resumed in an auto mode based on whether the mobile machine is within a threshold orientation from the interruption location or the resume location.

6. The method of claim 1, further including reversing the mobile machine from the interruption location to the resume location upon initiation of the auto mode.

7. The method of claim 1, further including displaying a restart location of the job, and allowing the auto mode of the mobile machine to be initiated when the mobile machine is positioned at the restart location.

8. The method of claim 1, wherein the displaying of the multiple job sites includes displaying the multiple job sites in a single interface on the display for user selection of a job site.

9. The method of claim 8, wherein the job site is a first job site and the interruption location and the resume location includes a first interruption location and a first resume location, and the method further includes displaying a second interruption location and a second resume location on the display when a selection of a second job site is received.

10. An automatic mode resume system for a mobile machine, comprising:
    a display of the mobile machine; and a controller configured to:
cause the mobile machine to move about a perimeter of a job site while recording a path of the mobile machine as the mobile machine moves about the perimeter;
generate a job plan for the job site based at least in part on the path about the perimeter;
store an interrupted status of a job being performed on the job site by the mobile machine upon interruption of the job for the job site;
cause the mobile machine to move outside of the perimeter of the job site following the interruption;
cause the mobile machine to display multiple job sites on the display, each job site including a stored interruption location and a resume location;
receive a selection of the job site from a user input;
cause the mobile machine to display an icon for the interruption location and an icon for the resume location for the selected job site on the display, wherein the icon for the resume location includes a location, orientation, and heading of the mobile machine; and
resume a job in an auto mode of the mobile machine based, at least in part, on the job plan including the path about the perimeter that was generated by recording the path of the mobile machine and whether the mobile machine is positioned at an offset distance or orientation from the interruption location and the resume location at the selected job site.

11. The system of claim 10, wherein the icon for the resume location and an icon for an actual location displayed on the display each includes a shape of the mobile machine.

12. The system of claim 10, wherein the controller is further configured to cause a display of an icon for a restart location of the job, and to allow the auto mode of the mobile machine to be initiated when the mobile machine is positioned at the restart location.

13. The method of claim 5, wherein the job is resumed in the auto mode based on whether the mobile machine is within a threshold distance from the interruption location or the resume location.

14. The method of claim 13, wherein the mobile machine is a compactor and a vibration system of the compactor is operated based at least in part on whether the compactor is positioned within the threshold distance.

15. The method of claim 14, wherein a vibration system of the compactor is operated based at least in part on whether the compactor is orientated at a threshold orientation.

16. The method of claim 5, wherein resuming of the job includes operating a vibration system and operating the mobile machine in an auto mode is conditioned on whether the mobile machine is positioned within a threshold distance and oriented at the threshold orientation.

17. A method for resuming a job performed on a job site by a compactor, comprising:
storing an interrupted status including a job completion status, an interruption location and an interruption orientation of the job being performed by the compactor upon interruption of the job for the job site;
displaying the job site on a display of the compactor, the job site including the stored interruption location and the interruption orientation and a stored resume location and a stored resume orientation;
displaying the interruption location and the resume location for the job site on the display;
displaying a heading of the compactor at a time of interruption of the compactor;
selecting between resuming a job from the interrupted location or restarting the job from the start location based at least in part on the job completion status; and
resuming the job in an auto mode of the compactor based, at least in part, on the job completion status and whether the compactor is positioned within a threshold distance of the interruption location or the resume location and at a threshold orientation of the interruption location or the resume location at the job site.

18. The method of claim 17, wherein the heading is reversed in an opposite direction when the compactor is operated in an automatic mode, such that the compactor moves in an opposite direction from when the compactor was interrupted at the interruption location.

19. The method of claim 17, wherein a vibration system of the compactor is increased from a frequency lower than an interrupted frequency to the interrupted frequency over time upon entry of the compactor to within the threshold distance.

20. The method of claim 19, wherein the vibration system of the compactor is increased to the interrupted frequency when the compactor is oriented at the threshold orientation.

* * * * *